United States Patent
Wicker et al.

(10) Patent No.: US 9,218,464 B2
(45) Date of Patent: Dec. 22, 2015

(54) INTERCEPTION OF CONTROLLED FUNCTIONS

(75) Inventors: James Wicker, San Jose, CA (US); Matt Poling, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2052 days.

(21) Appl. No.: 11/551,593

(22) Filed: Oct. 20, 2006

(65) Prior Publication Data

US 2014/0304761 A1 Oct. 9, 2014

Related U.S. Application Data

(63) Continuation of application No. 11/549,589.

(51) Int. Cl.
*G06F 21/10* (2013.01)

(52) U.S. Cl.
CPC ........ G06F 21/10 (2013.01); *G06F 2221/0735* (2013.01)

(58) Field of Classification Search
CPC .......................... G06F 21/10; G06F 2221/0735
See application file for complete search history.

(56) References Cited

U.S. PATENT DOCUMENTS

| | | | | |
|---|---|---|---|---|
| 5,699,428 A * | 12/1997 | McDonnal et al. | ........... | 713/165 |
| 5,974,549 A * | 10/1999 | Golan | ............... | 726/23 |
| 6,249,907 B1 * | 6/2001 | Carter et al. | ................... | 717/129 |
| 7,069,539 B1 * | 6/2006 | Roberts | ......................... | 717/110 |
| 2002/0023225 A1 * | 2/2002 | Lomnes | ......................... | 713/200 |
| 2002/0066021 A1 * | 5/2002 | Chien et al. | ................... | 713/200 |
| 2002/0099837 A1 * | 7/2002 | Oe et al. | ......................... | 709/229 |
| 2002/0172363 A1 * | 11/2002 | Dierks et al. | .................. | 380/259 |
| 2003/0050919 A1 * | 3/2003 | Brown et al. | ...................... | 707/2 |
| 2003/0115481 A1 * | 6/2003 | Baird et al. | ................... | 713/201 |
| 2004/0054894 A1 * | 3/2004 | Lambert | ....................... | 713/165 |
| 2004/0237067 A1 * | 11/2004 | Sun et al. | ....................... | 717/110 |
| 2004/0237071 A1 * | 11/2004 | Hollander et al. | ............ | 717/124 |
| 2007/0101435 A1 * | 5/2007 | Konanka et al. | ................. | 726/27 |
| 2007/0113291 A1 * | 5/2007 | Dai et al. | ......................... | 726/27 |
| 2008/0155702 A1 * | 6/2008 | Bala et al. | ........................ | 726/27 |

* cited by examiner

*Primary Examiner* — Darren B Schwartz
(74) *Attorney, Agent, or Firm* — Kilpatrick Townsend & Stockton LLP

(57) ABSTRACT

Briefly, in accordance with one embodiment of the invention, a plug-in type application may intercept called functions in order to implement one or more security or digital rights management type settings, and/or one or more policies for a given document where such functions may be restricted, prohibited, and/or otherwise controlled. Patch code may be integrated with such controlled functions to modify the behavior of the function when executed in order to comply with the security or digital rights management setting, and/or one or more policies.

30 Claims, 4 Drawing Sheets

INTERCEPTION OF CONTROLLED FUNCTIONS

CROSS-REFERENCE TO RELATED APPLICATIONS

The present application is a continuation of U.S. application Ser. No. 11/549,589, filed Oct. 13, 2006.

BACKGROUND

An author of a document or file may specify one or more security settings and/or digital rights management type settings for the document or file to control, limit, or otherwise restrict what functions may be operated on the document or file by an application. Furthermore, policies and/or controls may be arranged within a given network or other type of computing environment to control how the document or file may be handled by a user of the application. Often, it may be difficult to control how and/or what functions may be operated on the document or file with the application, for example after dissemination.

DESCRIPTION OF THE DRAWING FIGURES

Claimed subject matter is particularly pointed out and distinctly claimed in the concluding portion of the specification. However, both as to organization and/or method of operation, together with objects, features, and/or advantages thereof, may best be understood by reference to the following detailed description when read with the accompanying drawings in which:

Figure 1:
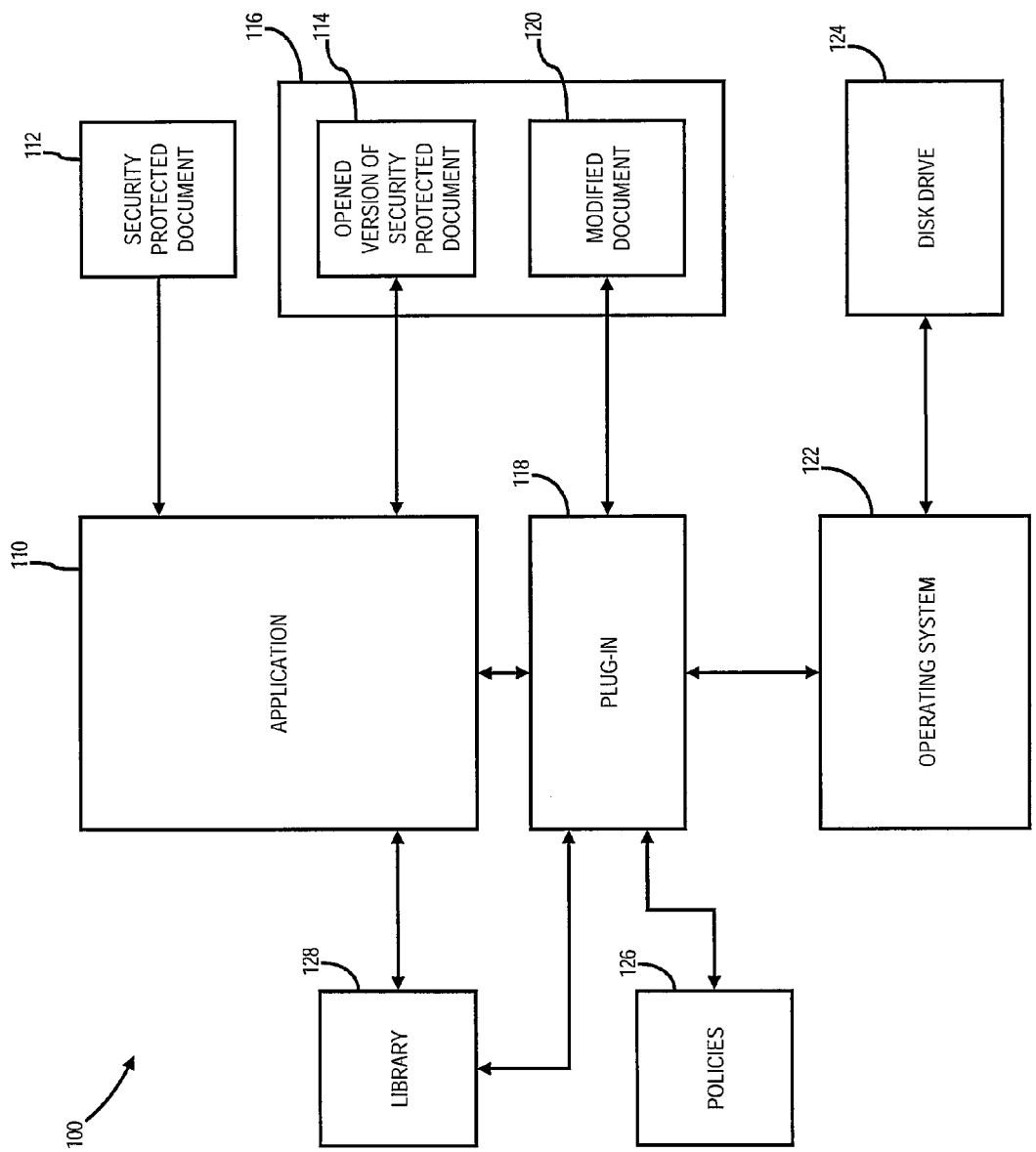
FIG. 1 is a block diagram of a system in which controlled functions are capable of being intercepted in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

An algorithm and/or process may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities.

Unless specifically stated otherwise, as apparent from the following discussions, it is appreciated that throughout the specification discussion utilizing terms such as processing, computing, calculating, determining, and/or the like, refer to the action and/or processes of a computer and/or computing system, and/or similar electronic computing device, that manipulate or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. A function may refer to a procedure capable of performing an operation in a programming context. Typically, functions that are frequently utilized may be stored in a library. A call may refer to an invocation of a routine or a function in a programming context. A plug-in may refer to a software module that is capable of providing additional features to an application or system. A policy may refer to a security property that establishes access rights, permissions, and/or expiration dates for a given document or set of documents. A policy may be dynamic in that the policy may be altered by an author of a document after the document has been distributed. A policy may be persistent because the security parameters of a document travel with the document at all or nearly all times, online or offline, inside or outside of a firewall or the like. A patch may refer to code that may be inserted into an executable program, function, routine, module, command, and/or instruction or the like. An assembler may refer to a program or code that translates programs from assembly language to machine language, or the like, and a disassembler may refer to a program that translates programs from machine language to assembly language, or the like.

Figure 4:
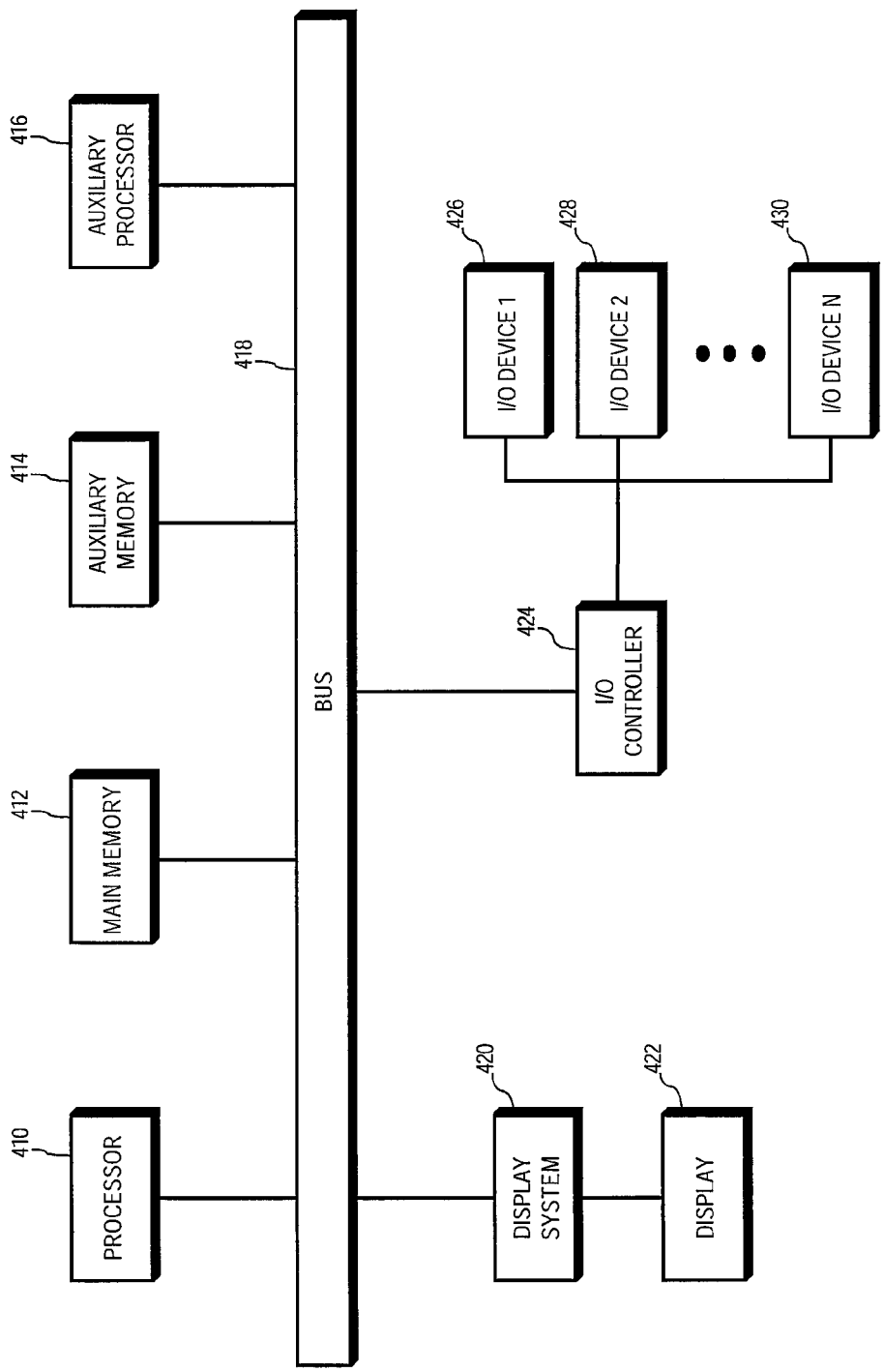
FIG. 4 is a block diagram of an information handling system capable of intercepting controlled functions in accordance with one or more embodiments.

Referring now to FIG. 1, a block diagram of a system in which controlled functions are capable of being intercepted in accordance with one or more embodiments will be discussed. As shown in FIG. 1, application 110 running on an information handling system and/or a computing platform or the like, for example as shown in FIG. 4, may open security protected document 112 for use and/or manipulation of security protected document 112 by application 110. For example, application 110 may be a word processor type application, a spreadsheet type application, a computer-aided design (CAD) type application, or a web browser type application, or the like. In one or more embodiments, application 110 may comprise Adobe® Acrobat® 7.0 Professional, or the like type of application, available from Adobe Systems Incorporated of San Jose, Calif., USA. In one or more embodiments, security protected document 112 may include one or more security features that may for example indicate that one or more functions that application 110 is capable of performing on documents in general may be prohibited, restricted, and/or otherwise controlled. For example, an author of security protected document 112 may allow security protected document to be opened and viewed by application 110, and/or may allow document 112 to be temporarily edited by a user of application 110, however the author may specify that security protected document 112 may not be printed or saved to a local disk drive 124 coupled to application 110 via operating system (OS) 122. Various other types of security features and/or control features may be specified for security protected document 112 as well, wherein such security features may not allow a full set of functions to be performed by application 110 on security protected document 112 that are otherwise able to be performed by application 110 on non-security protected type documents. However, these are merely example type of security and/or control features, and the scope of the claimed subject matter is not limited in this respect.

In one or more embodiments, plug-in 118 type software module may be loaded into memory, for example when application 110 is loaded into memory, and/or may be loaded into memory independent of when application is loaded into memory. Plug-in 118 may be incorporated into application 110 and/or another application, and/or may be incorporated into OS 122. Alternatively, plug-in 118 may be a separately executable program independent of any application and/or operating system. In a further alternative embodiment, plug-in 118 may be an applet and/or a servlet capable of running on a server and capable of affecting operation of application 110 running on a client in communication with the server. However, these are merely example embodiments for plug-in 118, and the scope of the claimed subject matter is not limited in this respect.

When application 110 opens security protected document 112, an opened version 114 of security protected document 112 may be loaded into memory 116 for use and/or manipulation by application 110. Memory 116 may comprise a random-access type memory circuit in an information handling and/or computing type platform. In such an arrangement, application 110 may be able to modify, change, edit, or otherwise perform operations on opened version 114 of security protected document 112 in accordance with one or more security settings of security protected document 112. In accordance with one or more alternative embodiments, control of the functions that application 110 is able to perform on opened version 114 of security protected document 120 may be set by one or more policies 126, for example by using Adobe® LiveCycle™ Policy Server available from Adobe Systems Incorporated, and which is capable of setting one or more persistent and/or dynamic policies for control of security protected document 112. However, this is merely one example by which one or more policies 126 for controlling functions of application 110 on security protected document 112, and the scope of the claimed subject matter is not limited in this respect.

In accordance with one or more embodiments, when application 110 attempts to perform one or more controlled functions, for example via calls of a function to OS 122, plug-in 118 may intercept such calls in order to implement one or more policies 126. Thus, plug-in may 118 be capable of controlling the interaction of application 110 with OS 122 in order to implement policies 126 and/or digital rights management (DRM) control of security protected document 112. For example, when application 110 attempts to save opened version 114 of security protected document 112 to disk drive 124 by making a call to OS 122 to perform a save function, plug-in 118 may intercept the call and deny the operation of the save function from occurring. In one or more alternative embodiments, plug-in 118 may redirect the function to an alterative location and/or to perform a modified version of the operation in accordance with one or more policies 126 and/or security of DRM type settings of security protected document 112. In such an embodiment, instead of having OS 122 save opened version 114 of security protected document 114 to disk drive 124, plug-in 118 may intercept the call to implement the save function and instead redirect the save to another location in memory 116. In such an embodiment, modified document 120 incorporating any changes that may have been made by application 110 to opened version 114 of security protected document 112 may be saved to memory 116, for example so that the modifications made will not necessarily be lost and user of application 110 may make further use of such modifications. Such interaction between application 110 and OS 122 may be based at least in part on plug-in 118 analyzing one or more functions in library 128 functions in order to intercept, modify, and/or otherwise redirect the functions of application 110 such that the operation of the functions in library 128 may be limited, prohibited, and/or otherwise controlled by one or more policies 126 and/or security or DRM type settings of security protected document 112. However, these are merely examples of how functions may be intercepted by plug-in 118, and the scope of the claimed subject matter is not limited in these respects.

Figure 2:
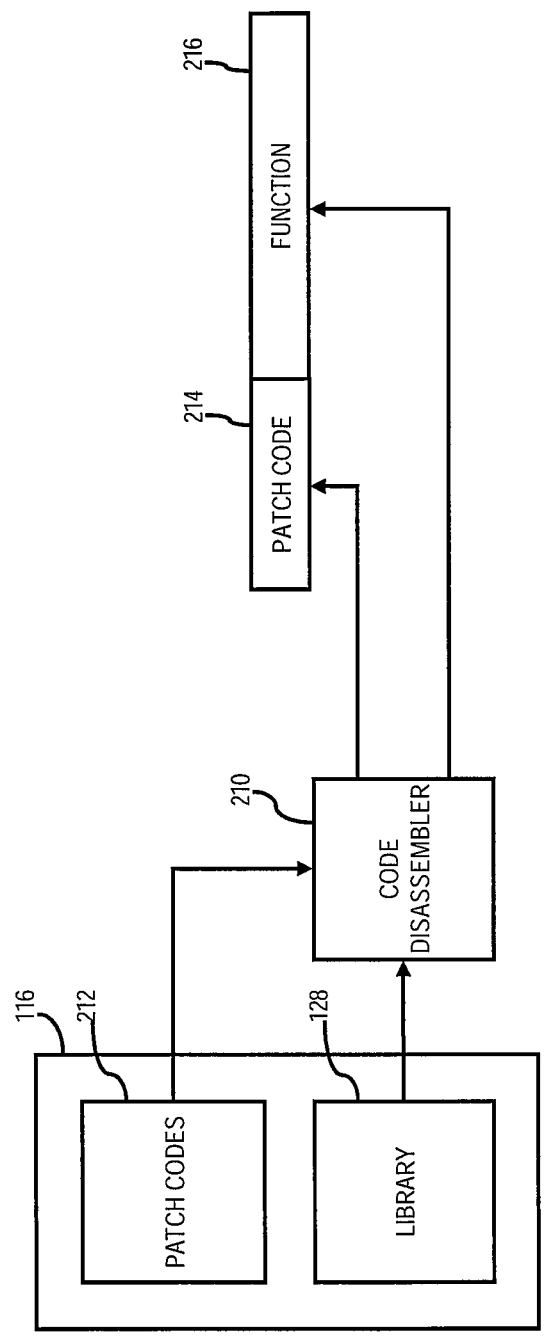
FIG. 2 is a block diagram of a code disassembler capable of intercepting and disassembling controlled functions in accordance with one or more embodiments.

Referring now to FIG. 2, a block diagram of a code disassembler capable of intercepting and disassembling controlled functions in accordance with one or more embodiments will be discussed. As shown in FIG. 2, code disassembler 210 may be a program, module, routine capable, and/or of being executed by plug-in 118 in one or more embodiments. When library 128 of functions is loaded into memory 116 and capable of being accessed by application 110, code disassembler 210 may look in library 128 for one or more functions that may be modified by code disassembler 210. For example, code disassembler may look up a "read file" function in library 128. In one or more embodiments, if the "read file" function in library 128 is called by application 110, code disassembler may append and/or replace a portion of the "read file" function with one or more path codes 212 that may also be stored in memory 116. Such a patch code may comprise, for example, a jump instruction that is capable of redirecting a call of a function to OS 122 instead to plug-in 118 so that plug-in 118 may intercept the called function and terminate and/or redirect the function in accordance with one or more policies 128 and/or security or DRM type settings of security protected document 112. In such an embodiment, one or more patch codes 214 from patch codes 212 may be appended to and/or replace a portion of function 216. Code disassembler 210 may include assembler type characteristics to be able to provide a modified function that is a combination of patch code 214 and the original function 216 to arrive at a modified version of function 216. For example, code disassembler 210 may overwrite at least a portion of function 216 with patch code 214. Furthermore, code disassembler 210 may examine how function 216 utilizes one or more registers of memory 116 to determine which registers may be destroyed in order to further facilitate the redirection of function 216 to plug-in 118 rather than to OS 122 when called by application 110. Such code disassembly by code disassembler 210 may be done in advance of the function being called, and then stored in library 128 as a modified function. Alternatively, such code disassembly by code disassembler 210 may be done in real-time and/or near real time upon a function being called. In one or more embodiments, code disassembler 210 may modify one or more functions 216 from library 128 using one or more patch codes 214 from available patch codes 212, wherein such functions may include, but not be limited to, a file read type function, a file write type function, a print type function, one or more clip board type functions such as a save to clip board type function, a macro type function, and so on. However, these are merely example types of functions that may be processed by code disassembler 210 in accordance with one or more embodiments, and the scope of the claimed subject matter is not limited in this respect.

Figure 3:
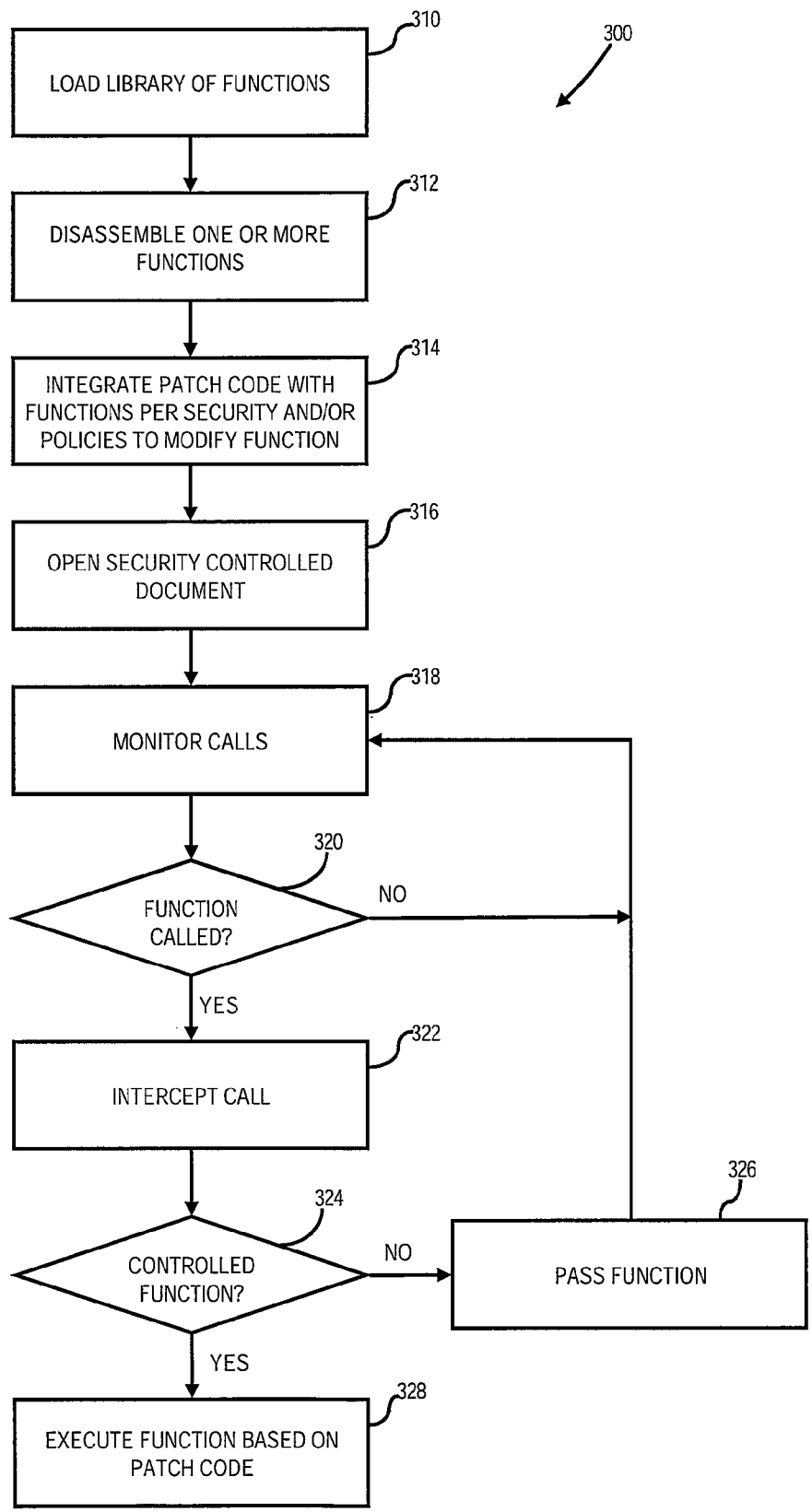
FIG. 3 is a flow diagram of a method for intercepting controlled functions in accordance with one or more embodiments.

Referring now to FIG. 3, a flow diagram of a method for intercepting controlled functions in accordance with one or more embodiments will be discussed. Method 300 may include the blocks shown in FIG. 3, and/or it may include more or fewer blocks than shown. Furthermore, FIG. 3 shows one order of the blocks of method 300, however other orders may be implemented, and the scope of the claimed subject matter is not limited in these respects. Method 300 may be executed by loading library 128 of functions at block 310 where the functions are capable of being called by application 110. Plug-in 118 may access library 128 to disassemble one or more of the functions at block 312 where the functions may be controlled via a security or DRM type setting in security protected document 112 and/or via one or more policies 126, by plug-in 118. In one or more embodiments, code disassembler 210 may integrate one or more patch codes 212 at block 314 with the functions in accordance with the security or DRM type setting and/or in accordance with policies 126 to result in a modified function comprising patch code 214 and function 216. Such disassembling and/or integrating may occur in advance of a call being made by application 110 and/or alternatively may occur as a call is made by application 110 in real time or near real time, for example upon plug-in 118 intercepting the call. Application 110 may open security controlled document 112 at block 316, and plug-in 118 may monitor calls made by application 110 at block 318. In the event a function is called at block 320, plug-in 118 may intercept the call at block 322. While no functions are being called, method may continue with the monitoring of calls at block 318. If a call is intercepted at block 322 by plug-in 118, a determination may be made at block 324 whether the function called is a controlled function. If it is determined that the function called is not a controlled function, the function may be passed at block 326 to its intended destination, for example to operating system 122. In the event the function called is a controlled function as determined at block 324, then the function may be executed based at least in part on patch code 214 integrated with function 216. However, these are merely example blocks embodying the interception of one or more controlled functions, and the scope of the claimed subject matter is not limited in these respects.

Referring now to FIG. 4, a block diagram of an information handling system capable of intercepting controlled functions in accordance with one or more embodiments will be discussed. Information handling system 400 as shown in FIG. 4 may tangibly embody a computing platform on which application 110 and/or plug-in 118 as discussed with respect to FIG. 1, and/or code disassembler 210 of FIG. 2, may be executed to implement method 300 of FIG. 3. Such a programs, applications, modules and/or machine readable instructions or the like may be tangibly stored on a computer and/or machine readable medium such as a compact disk (CD), digital versatile disk (DVD), flash memory, read-only memory type memory, hard disk drive (HDD), and so on. Information handling system 400 as shown in FIG. 4 may represent one embodiment of such a computing platform, wherein information handling system 400 may include fewer and/or more blocks to implement various types of computing platforms as desired, and the scope of the claimed subject matter is not limited in this respect.

As shown in FIG. 4, information handling system 400 may be controlled by processor 410. Processor 410 may comprise a central processing unit such as a microprocessor or microcontroller for executing programs, performing data manipulations and controlling the tasks of information handling system 400. Communication with processor 400 may be implemented via bus 418 for transferring information among the components of information handling system 400. Bus 418 may include a data channel for facilitating information transfer between storage and other peripheral components of information handling system 418. Bus 418 further may provide a set of signals utilized for communication with processor 410, including, for example, a data bus, and address bus, and/or a control bus. Bus 418 may comprise any bus architecture according to promulgated standards, for example industry standard architecture (ISA), extended industry standard architecture (EISA), Micro Channel Architecture (MCA), peripheral component interconnect (PCI) type local bus, standards promulgated by the Institute of Electrical and Electronics Engineers (IEEE) including IEEE 488 general-purpose interface bus (GPIB), IEEE 696/S-100, and so on, although the scope of the claimed subject matter is not limited in this respect.

Other components of information handling system may include, for example, main memory 412, and/or auxiliary memory 414. Information handling system 400 may further comprise auxiliary processing processor 416, which may be another processor, a digital signal processor, and so on. Main memory 412 may provide storage of instructions and data for programs to be executed by processor 410. Main memory 412 may be, for example, semiconductor-based memory such as dynamic random access memory (DRAM) and/or static random access memory (SRAM), and/or the like. Other semiconductor-based memory types may include, for example, synchronous dynamic random access memory (SDRAM), Rambus dynamic random access memory (RDRAM), ferro-electric random access memory (FRAM), polymer type memory, and so on. Auxiliary memory 412 may be utilized to store instructions and/or data that to be loaded into main memory 412 before execution. Auxiliary memory 414 may include semiconductor based memory such as read-only memory (ROM), programmable read-only memory (PROM), erasable programmable read-only memory (EPROM), electrically erasable read-only memory (EEPROM), and/or flash memory, and/or any block oriented memory similar to EEPROM. Auxiliary memory 414 may also include any type of non-semiconductor-based memories, including but not limited to magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), and so on. Other varieties of memory devices are contemplated as well. Information handling system 400 optionally include auxiliary processor 416 which may be an auxiliary processor to manage input/output, an auxiliary processor to perform floating point mathematical operations, a digital signal processor and/or any special-purpose microprocessor having an architecture suitable for fast execution of signal processing algorithms, a back-end processor and/or any subordinate type processor subordinate to processor 410, an additional microprocessor and/or controller for dual and/or multiple processor systems, and/or a coprocessor and/or additional processor. Such auxiliary processors may be discrete processors and/or or may be arranged in the same package as processor 410, for example in a multicore and/or multithreaded processor, however the scope of the claimed subject matter is not limited in these respects.

Information handling system 400 further may include display system 420 for connecting to display 422, and further may include input/output (I/O) controller 424 to connect to one or more I/O devices including, for example, I/O device 426, I/O device 428, up to an Nth I/O device, I/O device 430. Display system 420 may comprise a video display adapter having components for driving display 422, including, for example, video memory, a buffer, and/or a graphics engine. Such video memory may be, for example, video random access memory (VRAM), synchronous graphics random access memory (SGRAM), windows random access memory (WRAM), and/or the like. Display 422 may comprise a cathode ray-tube (CRT) type display such as a monitor and/or television, and/or may comprise an alternative type of display technology such as a projection type CRT type display, a liquid-crystal display (LCD) projector type display, an LCD type display, a light-emitting diode (LED) type display, a gas and/or plasma type display, an electroluminescent type display, a vacuum fluorescent type display, a cathodoluminescent and/or field emission type display, a plasma addressed liquid crystal (PALC) type display, a high gain emissive display (HGED) type display, and so forth. Input/output controller 424 may comprise one or more controllers and/or adapters to prove interface functions between one or more of I/O device 426, I/O device 428, and/or I/O device 430. For example, input/output controller 424 may comprise a serial port, parallel port, universal serial bus (USB) port, an IEEE 1394 serial bus port, infrared port, network adapter, printer adapter, radio-frequency (RF) communications adapter, universal asynchronous receiver-transmitter (UART) port, and/or the like, to interface between corresponding I/O devices such as a keyboard, mouse, trackball, touchpad, joystick, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, TV tuner card, touch screen, stylus, electro-acoustic transducer, microphone, speaker, audio amplifier, and/or the like. Input/output controller 424 and/or I/O device 426, I/O device 428, and/or I/O device 430 may provide and/or receive analog and/or digital signals to communicate between information handling system and external devices, networks, and/or information sources. Input/output controller 424 and/or I/O device 426, I/O device 428, and/or I/O device 430 may implement industry promulgated architecture standards, including, for example, Ethernet IEEE 802 type standards, such as IEEE 802.3 for broadband and/or baseband networks, IEEE 802.3z for Gigabit Ethernet, IEEE 802.4 for token passing bus networks, IEEE 802.5 for token ring networks, IEEE 802.6 for metropolitan area networks and/or the like, Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. Information handling system 400 of FIG. 4 is merely one example of an information handling system and/or computing platform, and the scope of the claimed subject matter is not limited in this respect.

Although the claimed subject matter has been described with a certain degree of particularity, it should be recognized that elements thereof may be altered by persons skilled in the art without departing from the spirit and/or scope of the claimed subject matter. It is believed that interception of controlled functions and/or many of its attendant applications will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method performed by a computer, the method comprising:

intercepting or redirecting a call to an operating system made via a function invoked by a software application in order to perform the function for a secure document, wherein the function is separate from the operating system, and wherein the function comprises an operation to be performed for the secure document;

determining one or more security policies for the secure document, wherein the one or more security policies are specific to the secure document, and wherein the one or more security policies restrict operation of one or more functions for the secure document;

determining, dependent on the one or more security policies, whether the operation of the function is restricted for the secure document;

in response to determining that the operation of the function is restricted for the secure document, executing a modified, patched version of the function, wherein the modified, patched version of the function is separate from the operating system and comprises patch code combined with the original function by insertion into the original function, and wherein the inserted patch code restricts the operation of the function for the secure document according to the one or more security policies;

wherein said executing the modified, patched version of the function accesses a version of the secure document in compliance with the restricted operation of the function for the secure document.

2. A method as claimed in claim 1, further comprising, executing an unrestricted function for the secure document without modifying the unrestricted function.

3. A method as claimed in claim 1, further comprising generating the modified, patched version of the function prior to said intercepting.

4. A method as claimed in claim 3, wherein said intercepting occurs prior to obtaining the modified, patched version of the function.

5. A method as claimed in claim 1, wherein the function comprises at least one of a read type function, a write type function, a save type function, a print type function, a copy type function, clipboard type function, a transmit type function, a send type function, or a macro type function, or combinations thereof.

6. The method of claim 1, further comprising modifying the function, wherein said modifying comprises disassembling the function and integrating the patch code into the function.

7. A method performed by a computer, the method comprising:
monitoring calls from a function invoked by a software application, wherein the function is separate from the operating system; and
in response to determining that a call from the function is directed to an operating system:
intercepting or redirecting the call, wherein the function comprises an operation to be performed for a secure document;
determining one or more security policies for the secure document, wherein the one or more security policies are specific to the secure document, and wherein the one or more security policies restrict operation of one or more functions for the secure document;
determining, dependent on the one or more security policies, whether the operation of the function is restricted for the secure document; and
in response to determining that the operation of the function is restricted for the secure document, executing a modified, patched version of the function, wherein the modified, patched version of the function is separate from the operating system and comprises patch code combined with the original function by insertion into the original function, and wherein the inserted patch code restricts the operation of the function for the secure document according to the one or more security policies;
wherein said executing the modified, patched version of the function accesses a version of the secure document in compliance with the restricted operation of the function for the secure document.

8. A method as claimed in claim 7, wherein the call comprises a write to a disk, and said executing comprises rerouting the write to an alternative location.

9. A method as claimed in claim 7, wherein the call comprises a write to a disk, and said executing comprises rerouting the write to a memory circuit.

10. A method as claimed in claim 7, wherein the one or more security policies comprise at least one of a security type setting, a digital rights management type setting, or a policy, or combinations thereof.

11. An apparatus, comprising:
means for intercepting or redirecting a call to an operating system made via a function invoked by a software application in order to perform the function for a secure document, wherein the function is separate from the operating system, and wherein the function comprises an operation to be performed for the secure document;
means for determining one or more security policies for the secure document, wherein the one or more security policies are specific to the secure document, and wherein the one or more security policies restrict operation of one or more functions for the secure document;
means for determining, dependent on the one or more security policies, whether the operation of the function is restricted for the secure document; and
means for, in response to determining that the operation of the function is restricted for the secure document, executing a modified, patched version of the function, wherein the modified, patched version of the function is separate from the operating system and comprises patch code combined with the original function by insertion into the original function, and wherein the inserted patch code restricts the operation of the function for the secure document according to the one or more security policies;
wherein said executing the modified, patched version of the function accesses a version of the secure document in compliance with the restricted operation of the function for the secure document.

12. An apparatus as claimed in claim 11, further comprising, means for executing an unrestricted function for the secure document without modifying the unrestricted function.

13. An apparatus as claimed in claim 11, further comprising means for generating the modified, patched version of the function prior to said intercepting.

14. An apparatus as claimed in claim 11, wherein said intercepting operates prior to obtaining the modified, patched version of the function.

15. An apparatus as claimed in claim 11, wherein the restricted function comprises at least one of a read type function, a write type function, a save type function, a print type function, a copy type function, clipboard type function, a transmit type function, a send type function, or a macro type function or combinations thereof.

16. An apparatus as claimed in claim 11, further comprising means for modifying the function, wherein said modifying comprises disassembling the function and integrating the patch code into the function.

17. An apparatus, comprising:
means for monitoring calls from a function invoked by a software application, wherein the function is separate from the operating system; and
means for, in response to determining that a call from the function is directed to an operating system:
intercepting or redirecting the call, wherein the function comprises an operation to be performed for a secure document;
determining one or more security policies for the secure document, wherein the one or more security policies are specific to the secure document, and wherein the one or more security policies restrict operation of one or more functions for the secure document;
determining, dependent on the one or more security policies, whether the operation of the function is restricted for the secure document; and
in response to determining that the operation of the function is restricted for the secure document, executing a modified, patched version of the function, wherein the modified, patched version of the function is separate from the operating system and comprises patch code combined with the original function by insertion into the original function, and wherein the inserted patch code restricts the operation of the function for the secure document according to the one or more security policies;
wherein said executing the modified, patched version of the function accesses a version of the secure document in compliance with the restricted operation of the function for the secure document.

18. An apparatus as claimed in claim 17, wherein the call comprises a write to a disk, and said executing means comprises means for rerouting the write to an alternative location.

19. An apparatus as claimed in claim 17, wherein the call comprises a write to a disk, and said executing means comprises means for rerouting the write to a memory circuit.

20. An apparatus as claimed in claim 17, wherein the one or more security policies comprise at least one of a security type setting, a digital rights management type setting, or a policy, or combinations thereof.

21. An article of manufacture comprising a non-transitory storage medium having instructions stored thereon that, when executed, result in:
- intercepting or redirecting a call to an operating system made via a function invoked by a software application in order to perform the function for a secure document, wherein the function is separate from the operating system, and wherein the function comprises an operation to be performed for the secure document;
- determining one or more security policies for the secure document, wherein the one or more security policies are specific to the secure document, and wherein the one or more security policies restrict operation of one or more functions for the secure document;
- determining, dependent on the one or more security policies, whether the operation of the function is restricted for the secure document; and
- in response to determining that the operation of the function is restricted for the secure document, executing a modified, patched version of the function, wherein the modified, patched version of the function is separate from the operating system and comprises patch code combined with the original function by insertion into the original function, and wherein the inserted patch code restricts the operation of the function for the secure document according to the one or more security policies;
- wherein said executing the modified, patched version of the function accesses a version of the secure document in compliance with the restricted operation of the function for the secure document.

22. An article of manufacture as claimed in claim 21, wherein the instructions, when executed, further result in, executing an unrestricted function for the secure document without modifying the unrestricted function.

23. An article of manufacture as claimed in claim 21, wherein the instructions, when executed, further result in generating the modified, patched version of the function prior to said intercepting.

24. An article of manufacture as claimed in claim 21, wherein the instructions, when executed, further result in said intercepting occurring prior to obtaining the modified, patched version of the function.

25. An article of manufacture as claimed in claim 21, wherein the restricted function comprises at least one of a read type function, a write type function, a save type function, a print type function, a copy type function, clipboard type function, a transmit type function, a send type function, or a macro type function, or combinations thereof.

26. An article of manufacture as claimed in claim 21, further comprising means for modifying the function, wherein said modifying comprises disassembling the function and integrating the patch code into the function.

27. An article of manufacture comprising a non-transitory storage medium having instructions stored thereon that, when executed, result in:
- monitoring calls from a function invoked by a software application, wherein the function is separate from the operating system; and
- in response to determining that a call from the function is directed to an operating system:
  - intercepting the call, wherein the function comprises an operation to be performed for a secure document;
  - determining one or more security policies for the secure document, wherein the one or more security policies are specific to the secure document, and wherein the one or more security policies restrict operation of one or more functions for the secure document;
  - determining, dependent on the one or more security policies, whether the operation of the function is restricted for the secure document; and
  - in response to determining that the operation of the function is restricted for the secure document, executing a modified, patched version of the function, wherein the modified, patched version of the function is separate from the operating system and comprises patch code combined with the original function by insertion into the original function, and wherein the inserted patch code restricts the operation of the function for the secure document according to the one or more security policies;
  - wherein said executing the modified, patched version of the function accesses a version of the secure document in compliance with the restricted operation of the function for the secure document.

28. An article of manufacture as claimed in claim 27, wherein the call comprises a write to a disk, and wherein the instructions, when executed, further result in said executing causing the rerouting of the write to an alternative location.

29. An article of manufacture as claimed in claim 27, wherein the call comprises a write to a disk, and wherein the instructions, when executed, further result in said executing causing rerouting of the write to a memory circuit.

30. An article of manufacture as claimed in claim 27, wherein the one or more security policies comprise at least one of a security type setting, a digital rights management type setting, or a policy, or combinations thereof.

* * * * *